United States Patent [19]

Sato et al.

[11] Patent Number: 4,492,985
[45] Date of Patent: Jan. 8, 1985

[54] BEAM SCANNING MEANS FOR INPUT/OUTPUT UNIT

[75] Inventors: Masato Sato; Hiroyuki Kataoka; Yoshio Arai, all of Kanagawa, Japan

[73] Assignee: Fuji Xerox Co., Ltd., Tokyo, Japan

[21] Appl. No.: 291,738

[22] Filed: Aug. 10, 1981

[30] Foreign Application Priority Data

Aug. 19, 1980 [JP] Japan ............................ 55-116383[U]

[51] Int. Cl.³ .............................................. H04N 1/10
[52] U.S. Cl. .................................... 358/293; 358/206; 358/208; 250/234
[58] Field of Search ................ 358/293, 138, 285, 288, 358/280, 284, 294, 206, 208; 250/234

[56] References Cited

U.S. PATENT DOCUMENTS

| | | | |
|---|---|---|---|
| 4,251,821 | 2/1981 | Kimura | 358/285 |
| 4,268,867 | 5/1981 | Traimo | 358/293 |
| 4,386,271 | 5/1983 | Chiang et al. | 358/208 |

FOREIGN PATENT DOCUMENTS 47-27619 10/1972 Japan .

Primary Examiner—John C. Martin
Assistant Examiner—Edward L. Coles
Attorney, Agent, or Firm—Sughrue, Mion, Zinn, Macpeak & Seas

[57] ABSTRACT

An input and/or output unit which reads or records a picture utilizing a scanning beam in which sampling positions of picture elements in a main scanning direction are uniformly spaced. A first clock signal is produced which is at least three times as high in frequency as an output sampling clock signal. The first clock signal operates a counter, the output of which is compared with the output of a ROM. The ROM is addressed by a counter which is incremented by output comparison pulses. The output of the comparator is also utilized as the output sampling signal. Numerical values are stored in the ROM such that the output pulses from the comparator occur at times corresponding to constant sampling intervals of the scanning beam along a scanning line.

7 Claims, 6 Drawing Figures

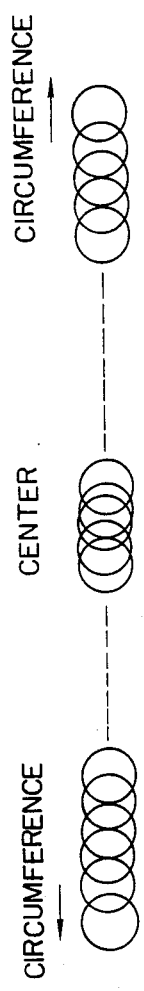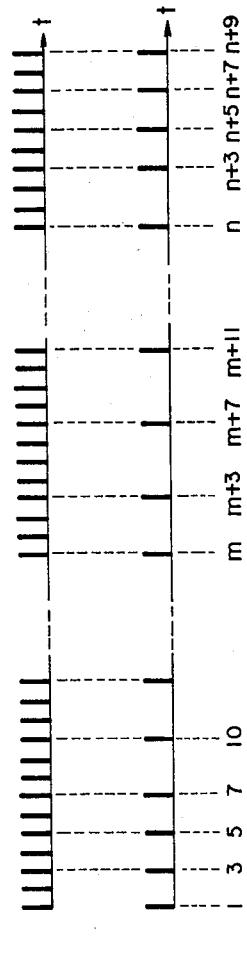

BEAM SCANNING MEANS FOR INPUT/OUTPUT UNIT

BACKGROUND OF THE INVENTION

The present invention relates to an input and/or output unit of a scanning type. In particular, the invention relates to a beam scanning device for an input and/or output unit for a picture which is constituted in such a way that the sampling position of picture elements in the main scanning direction thereof is constant.

There has previously been employed a scanner in the conventional input and/or output unit of a beam scanning device. It is well known that the speed of a spot of light outputted by the scanner at the circumference on the scanned paper surface is higher that at the center.

Thus, as shown in FIG. 1(a), the amount of overlap of spots for adjacent sampling periods is low at the edges of the paper, while the amount of overlap is high at the center of the paper. Hence, the sampling density is low at the edges of the paper while the sampling density is high at the center of the paper in the conventional scanning type input and/or output unit. Thus the conventional unit suffers from a drawback in that the linearity of the sampling position of the picture element in the main scanning is not good.

SUMMARY OF THE INVENTION

An object of the present invention is to eliminate the above-mentioned drawback in accordance with the prior art by providing correction so that the sampling positions of the picture element in the main scanning direction are uniformly spaced.

In accordance with this and other objects of the invention, there is provided an input and/or output unit for pictures which reads or records a picture by a scanning beam in accordance with a sampling signal produced by a sampling signal generator with the sampling signal being produced such that the interval along a scanning line of a beam between adjacent sampling points is constant throughout the entire scanning line. To effect this, numerical values are stored in a read-only memory corresponding to sequential positions along the scanning line.

A first clock signal operates a first counter, the output of which is compared with the output of the read-only memory. The read-only memory is addressed by an address counter which is incremented in response to output comparison pulses from the comparator. The output signal from the comparator is also utilized as a sampling signal for a video signal. Preferably, the first clock has a frequency at least three times that of the output signal from the comparator.

BRIEF DESCRIPTION OF THE DRAWINGS

FIG. 1(a) is an explanatory view for explaining the overlapping of light spots;

FIG. 1(b) is an explanatory view for explaining sampling positions on a paper surface;

FIG. 1(c) and FIG. 1(d) are timing charts of the sampling clock;

FIG. 1(e) is a view showing an example of the numerical values stored in a ROM.

DESCRIPTION OF THE PREFERRED EMBODIMENTS

Figure 2:
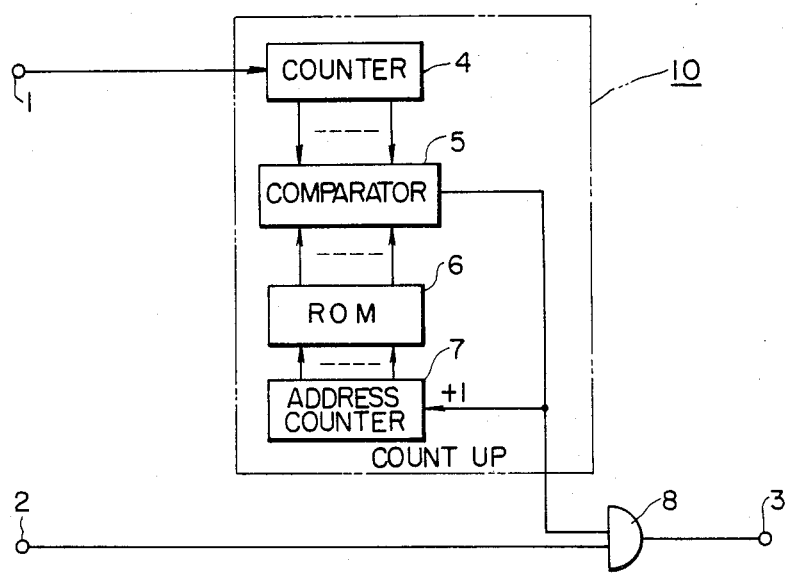
FIG. 2 is a block diagram of a embodiment of a clock generator constructed in accordance with the present invention.

The present invention will be explained in detail below based on a preferred embodiment.

FIG. 1(b) indicates desired sampling positions on the paper. In accordance with the present invention, the distance between the sampling positoins on the paper is made constant as shown in FIG. 1(b) in order to improve the linearity of the sampling positions of the picture elements in the main scanning direction. For effecting the sampling of the picture elements, it is necessary to synchronize the sampling positions on the paper surface and the scanning spot. Therefore, it is required that the sampling interval at the edges of the paper surface be made short while the sampling interval at the center of the paper surface be made long.

In order to realize this, there is provided in accordance with the present invention, a first sampling clock of which the frequency is approximately three times as high as the maximum frequency of the actually used sampling clock. The first sampling clock is frequency divided with a variable frequency division ratio to produce an actually-used second sampling clock.

That is, there is provided a first sampling clock of which the frequency is high as shown in FIG. 1(c). When the spot is scanned at the edges of the paper surface, the frequency of this first sampling clock is divided, for example, with a frequency division ratio of 2. Then, as the spot approaches the center of the paper surface, the frequency division ratio of the first sampling clock is increased, for example, to 3 then 4 and so forth. As the spot passes beyond the center of the paper surface, the frequency division ratio is again decreased, for example, to 4, 3, 2 and so forth. The control of the frequency division ratio is effected by a control circuit as shown in FIG. 2.

With the sampling of the picture information on the paper surface effected by the second sampling clock (FIG. 1(b)) which is generated as described above, the distance between the sampling positions on the paper surface will be constant as shown in FIG. 1(b). Thus, the sampling density of the picture information on the paper surface is substantially uniform over the entire surface in the main scanning direction.

A preferred embodiment of an apparatus for generating the second clock signal in accordance with the present invention is shown in FIG. 2. In FIG. 2, reference numeral 1 denotes the first input terminal to the input of which is supplied the first sampling clock as shown in FIG. 1(c), reference numeral 2 denotes the second input terminal to which is supplied a video signal such as a picture signal as an input and reference numeral 3 denotes an output terminal at which is developed a video signal. Reference numeral 10 denotes a sampling signal generator which generates a sampling signal with a timing such that the interval between sampling points on the scanning line of the beam is constant. This sampling signal generator is composed of a counter 4, a comparator 5, a ROM 6 and an address counter 7.

In the ROM 6 are written numerical values for dividing the first sampling clock so that the distance between the sampling positions is constant within each scanning line on the paper surface. For example, there are stored numerical values such as 1, 3, 5, 7, 10 . . . m, m+3, m+7, m+11, . . . n, n+3, n+5, n+7, n+9 as shown in FIG. 1(e).

The first sampling clock, as shown in FIG. 1(c), is supplied to the first input terminal 1 and the counter 4 counts the pulses of this clock. The comparator 5 compares the counted value of the counter 4 and the numerical value which is stored in the ROM 6 until they become equal to each other, whereupon an output pulse is outputted to one of the input terminals of an AND gate 8. A video signal of the picture is supplied as an input to the other input terminal 2 of the AND gate 8. The sampling of this video signal is effected by the output pulses from the comparator 5. Every time an output pulse is outputted by the comparator 5, the address counter 7 advances by one count and thereby updates the address supplied to the ROM 6 which then in turn outputs a new numerical value.

It is assumed, for example, that numerical values 1, 3, 5, 7, 10 ... m, m+3, m+7, m+11 ..., n, n+3, n+5, n+7, n+9 as shown in FIG. 1(e) are stored in the ROM 6 as mentioned above. With the first sampling clock as shown in FIG. 1(c) supplied to the input terminal 1, the first pulse of the first sampling clock is passed through as an output from the comparator 5. As a result, the video signal which is supplied to the terminal 2 is present at the output terminal. At the same time, the count of the address counter 7 is incremented by one count value and the ROM 6 is addressed in such a way that the numerical value 3 which is stored in the ROM 6 is read out. Therefore, the third pulse of the first sampling clock is then outputted from the comparator 5.

Sampling of the video signal is effected by the third pulse. At the same time, the address counter 7 is incremented and the ROM 6 is addressed in such a way that the numerical value 5 is read from the ROM 6.

The frequency of the first sampling clock is then likewise divided by the numerical value which is stored in the ROM 6. The sampling for the video signal is effected by this frequency-divided pulse signal.

In the above-described embodiment, the frequency of the first sampling clock is set to be three times as high as the maximum frequency of the actually used sampling clock. However, the present invention is not limited thereto.

In accordance with the present invention as mentioned above, since the interval for the sampling is set short at the edges of the paper surfaces while the interval is set long at the center of the paper surface, the sampling position on the paper surface is uniform in the main scanning direction. Therefore, there is an advantageous effect in that the linearity of the sampling position of the picture element within the main scanning direction is quite good.

What is claimed is:

1. In an input and/or output unit for pictures which reads or records a picture with a scanning beam, the improvement comprising: a sampling signal generator for generating a sampling signal with a timing such that an interval of said scanning beam between sampling points on a scanning line is constant, said said interval being determined by a read-only memory storing numerial values corresponding to constant sampling point intervals on a scanned surface.

2. The input and/or output unit of claim 1 wherein said sampling signal generator comprises means for dividing a first clock for producing said sampling signal in accordance with said numerical values stored in said read-only memory.

3. The input and/or output unit of claim 2 wherein said numerical values stored in said read-only memory correspond sequentially to positions along a scanning line of said beam in a main scanning direction, differences between adjacent ones of said numerical values increasing towards a center position along said scanning line.

4. A sampling signal generating for generating a sampling signal for a beam scanning type input and/or output unit comprising: a first counter having a clock input coupled to a source of a first clock signal; a second counter; a read-only memory having address inputs coupled to count outputs of said second counter; a comparator having a first input port coupled to a count output of said first counter and a second input port coupled to a data output of said read-only memory, a comparison output of said comparator being coupled to a count input of said second counter; and an AND gate having a first input coupled to receive said output from said comparator and a second input coupled to receive a video signal.

5. The sampling signal generator of claim 4 wherein numerical values are stored in said read-only memory corresponding to positions of said scanning beam along a scanning line such that output pulses on said output of said comparator occur at times such that said video signal is sampled with said output of said comparator at said AND gate at times corresponding to constant sampling intervals along said scanning line.

6. The sampling signal generator of claim 5 wherein differences between adjacent ones of said numerical values stored in said read-only memory increase towards values corresponding to a center portion of said scanning line.

7. A sampling signal generator for generating a sampling signal for a beam scanning type input and/or output unit with a sampling timing such that an interval of said scanning beam between sampling points on a scanning line is constant, comprising: a read-only memory storing data values at corresponding addresses relating said sampling timing to positions along said scanning line; means for sequentially reading out said data values from said read-only memory as said scanning beam moves along said scanning line; a source of a clock signal of constant frequency; and means for varying a frequency of said clock signal in response to said data values read out from said read-only memory.

* * * * *